United States Patent Office 3,278,532
Patented Oct. 11, 1966

---

3,278,532
DIOXYBENZOTHIADIAZINES
William J. Houlihan, Mountain Lakes, N.J., assignor to Sandoz Inc., Hanover, N.J.
No Drawing. Filed July 6, 1964, Ser. No. 380,619
16 Claims. (Cl. 260—243)

This invention is directed to benzothiadiazine dioxides of formulae

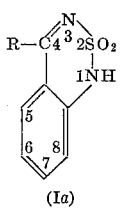

(Ia)

and

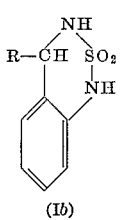

(Ib)

wherein R is either lower alkyl, e.g. methyl, ethyl, propyl, isopropyl, and butyl;

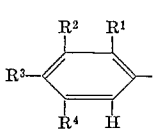

or

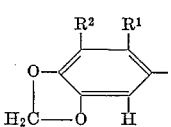

and
each of $R^1$, $R^2$, $R^3$, and $R^4$ is, independently, either a hydrogen atom (—H); lower alkyl having from one to five carbon atoms, e.g. methyl, ethyl, propyl, isopropyl, butyl, and amyl; lower alkoxy having from one to five carbon atoms, e.g. methoxy, ethoxy, propoxy, isopropoxy, butoxy, and pentoxy; di(lower)alkylamino, each alkyl having from one to five carbon atoms, e.g. N-methyl-N-ethyl-amino; aziridyl; pyrrolidyl; piperidyl; homopiperidyl; a fluorine atom (—F); a chlorine atom (—Cl); a bromine atom (—Br); or trifluoromethyl (—$CF_3$), with the proviso that a plurality of trifluoromethyl groups are not ortho to each other.

Compounds (Ia) are prepared according to the reaction:

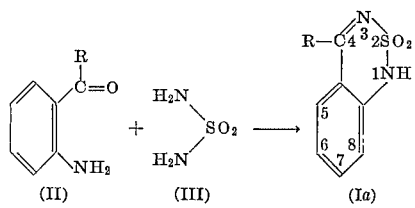

Compound (II) and sulfamide (III) are heated with a tertiary amine at a temperature within the range of from about 50° to about 250° C. A reaction temperature in excess of 50° C. is recommended, and a preferred range is from about 55° C. to about 125° C. Agitation may be employed during the reaction, but none is required.

The tertiary amine provides a solvent system (medium) in which the reaction takes place. Contemplated tertiary amines include, for example, tri(lower)alkylamines, e.g. triethylamine; aryldi(lower)alkylamines, e.g. phenyldimethylamine; diaryl(lower)alkylamides, e.g. diphenylethylamine; triarylamines, e.g. triphenylamine; (lower)alkyl pyrroles, e.g. N-propyl-pyrrole; pyridine; (lower)alkyl pyridines, e.g. 3-ethyl pyridine; (lower)alkoxy pyridines, e.g. 2,5-dimethoxy-pyridine; quinoline; (lower)alkyl quinolines, e.g. 8-ethyl-quinoline; (lower)alkoxy quinolines, e.g. 3,6-dimethoxy-quinoline; N-(lower)alkyl morpholine, e.g. N-methyl-morpholine; N-aryl morpholine, e.g. N-phenyl-morpholine; N,N'-di(lower)alkyl-piperazine, e.g. N-methyl-N'-ethyl-piperazine; N,N'-ar(lower)alkyl piperazine, e.g. N-phenyl-N'-propyl-piperazine; and N,N'-diarylpiperazine, e.g. N,N'-diphenylpiperazine.

The temperature at which the reaction is conducted is usually the reflux temperature of the medium.

Compounds (Ib) are prepared from compounds (Ia) by reacting the former in an alcoholic medium with sodium borohydride at a temperature of from 30° C. to 65° C.

Compounds (I), i.e. (Ia) and (Ib), are useful as sedatives and mild tranquilizers and may be administered either orally or parenterally in daily doses of from 150 milligrams to 250 milligrams.

The examples are merely illustrative of the invention, all temperatures being in degrees centigrade, the parts and percentages being by weight unless otherwise stated, all temperatures being in degrees centigrade, the parts by volume being the same as that between the kilogram and the liter.

EXAMPLE 1

*4-phenyl-1H-2,1,3-benzothiadiazine-2,2-dioxide*

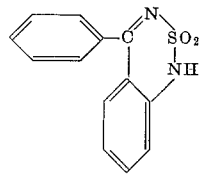

Admix in a flask equipped with a stirrer and a condenser attached to a bubble detector, 3.94 parts (0.02 mole) of 2-aminobenzophenone, 1.92 parts (0.02 mole) of sulfamide, and 80 parts by volume of pyridine. Stir and reflux the resulting solution until gassing ceases. Filter the resultant solution and then remove the solvent in vacuo on a rotary evaporator. Dissolve the residue in hot methanol-water, admix the obtained solution with charcoal, and filter the resultant product. Refrigerate the filtrate to obtain 1.5 parts of the title compound, melting point (M.P.) 102° to 104°.

In a similar manner, by selecting the corresponding compound (II), each of the compounds (I) enumerated (by definition of substituents) in Table A is prepared.

TABLE A

| Example | R¹ | R² | R³ | R⁴ |
|---|---|---|---|---|
| (1a) | —H | —Me | —O—CH₂—O— | |
| (1b) | —H | —H | —Et | —H |
| (1c) | —aziridyl | —H | —H | —Pr |
| (1d) | —iPr | —pyrrolidyl | —H | —H |
| (1e) | —F | —Br | —O—CH₂—O— | |
| (1f) | —H | —CF₃ | —Am | —piperidyl |
| (1g) | —Cl | —Cl | —H | —OMe |
| (1h) | —OEt | —H | —O—CH₂—O— | |
| (1i) | —H | —OPr | —homo-piperidyl | —H |
| (1j) | —H | —H | —OiPr | —F |
| (1k) | —CF₃ | —H | —CF₃ | —OBu |
| (1l) | —OAm | —H | —H | —Cl |
| (1m) | —CF₃ | —N(Me)(Me) | —O—CH₂—O— | |
| (1n) | —H | —CF₃ | —N(Et)(Bu) | —CF₃ |
| (1o) | —H | —H | —CF₃ | —N(iPr)(Am) |
| (1p) | —N(Pr)(Pr) | —H | —Br | —CF₃ |

Wherein: —Me is methyl; —Et is ethyl; —Pr is propyl; —iPr is isopropyl; —Bu is butyl; and —Am is amyl.

EXAMPLE 2

*4-methyl-1H-2,1,3-benzothiadiazine-2,2-dioxide*

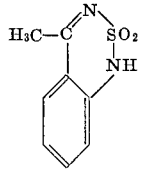

Admix in a flask equipped with a stirrer and a condenser attached to a bubble detector, 10 parts (0.073 mole) of 2-aminoacetophenone, 7.7 parts (0.08 mole) of sulfamide, and 75 parts by volume of pyridine. Stir and reflux the resulting solution until gassing ceases. Filter the resultant solution and then remove the solvent in vacuo on a rotary evaporator. Dissolve the residue in hot methanol-water, admix the obtained solution with charcoal, and filter the resultant product. Refrigerate the filtrate to obtain 5.0 parts of the title compound, M.P. 207° to 209°.

By replacing the 2-aminoacetophenone, in separate reactions, by each compound (II) enumerated in Table B by its substituent R, the corresponding compound (I) is obtained in similar manner.

TABLE B

| Example: | R |
|---|---|
| 2a | —Et |
| 2b | —Pr |
| 2c | —iPr |
| 2d | —Bu |

EXAMPLE 3

*4-methyl-3,4-dihydro-1H-2,1,3-benzothiadiazine-2,2-dioxide*

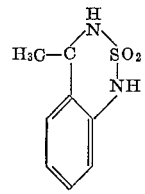

To a stirred solution of 14.6 parts (0.09 mole) of 4-methyl-1H-2,1,3-benzothiadiazine-2,2-dioxide in methanol, add portionwise 14.0 parts (0.37 mole) of sodium borohydride at such a rate that the internal temperature does not exceed 30° C. Stir the mixture overnight at room temperature. Evaporate the reaction mixture on a rotary evaporator. Treat the resultant semi-solid with 350 parts by volume of water, and then extract with two 200 parts by volume portions of methylene chloride. Dry the methylene chloride extracts to obtain the title compound.

By this same procedure each of the compounds exemplified in Examples 1 and 2 is converted to the corresponding compound (1b).

What is claimed is:
1. 4-phenyl-1H-2,1,3-benzothiadiazine-2,2-dioxide.
2. 4-(2',4'-dichlorophenyl)-1H-2,1,3-benzothiadiazine-2,2-dioxide.
3. 4 - (2',4',5'-trichlorophenyl) - 1H-2,1,3-benzothiadiazine-2,2-dioxide.
4. 4 - (4' - trifluoromethylphenyl)-1H-2,1,3-benzothiadiazine-2,2-dioxide.
5. 4 - (lower alkyl)-1H-2,1,3-benzothiadiazine-2,2-dioxide.
6. 4-methyl-1H-2,1,3-benzothiadiazine-2,2-dioxide.
7. 4 - methyl - 3,4-dihydro-1H-2,1,3-benzothiadiazine-2,2-dioxide.
8. A compound of the formula

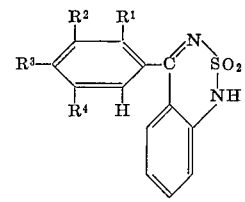

wherein each of R¹, R², R³, and R⁴ is, independently, a member selected from the group consisting of a hydrogen atom, lower alkyl, lower alkoxy, di(lower)alkylamino, aziridyl, pyrrolidyl, piperidyl, homopiperidyl, a fluorine atom, a chlorine atom, a bromine atom and trifluoromethyl, with the proviso that a plurality of trifluoromethyl groups are not ortho to each other.

9. The compound of the formula

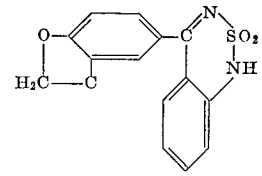

10. A compound of the formula

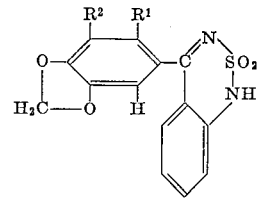

wherein each of R¹ and R² is, independently, a member selected from the group consisting of a hydrogen atom, lower alkyl, lower alkoxy, di(lower)alkylamino, aziridyl, pyrrolidyl, piperidyl, homopiperidyl, a fluorine atom, a chlorine atom, a bromine atom, and trifluoromethyl, with the proviso that the compound contain at most one trifluoromethyl group.

11. A compound of the formula

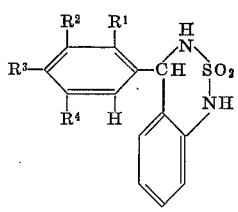

wherein each of $R^1$, $R^2$, $R^3$, and $R^4$ is, independently, a member selected from the group consisting of a hydrogen atom, lower alkyl, lower alkoxy, di(lower)alkylamino, aziridyl, pyrrolidyl, piperidyl, homopiperidyl, a fluorine atom, a chlorine atom, a bromine atom and trifluoromethyl, with the proviso that a plurality of trifluoromethyl groups are not ortho to each other.

12. The compound of the formula

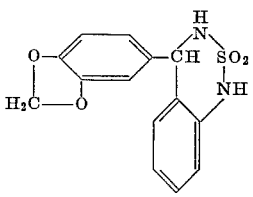

13. A compound of the formula

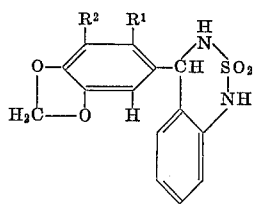

wherein each of $R^1$ and $R^2$ is, independently, a member selected from the group consisting of a hydrogen atom, lower alkyl, lower alkoxy, di(lower)alkylamino, aziridyl, pyrrolidyl, piperidyl, homopiperidyl, a fluorine atom, a chlorine atom, a bromine atom, and trifluoromethyl, with the proviso that the compound contain at most one trifluoromethyl group.

14. 4 - (2',4' - dichlorophenyl)-3,4-dihydro-1H-2,1,3-benzothiadiazine-2,2-dioxide.

15. 4 - (2',4',5'-trichlorophenyl)-3,4-dihydro-1H-2,1,3-benzothiadiazine-2,2-dioxide.

16. 4 - (4' - trifluoromethylphenyl) - 3,4-dihydro-1H-2,1,3-benzothiadiazine-2,2-dioxide.

References Cited by the Examiner
UNITED STATES PATENTS
3,201,396   8/1965   Wright _____ 260—243

WALTER A. MODANCE, *Primary Examiner.*

J. M. FORD, *Assistant Examiner.*

UNITED STATES PATENT OFFICE
CERTIFICATE OF CORRECTION

Patent No. 3,278,532            October 11, 1966

William J. Houlihan

It is hereby certified that error appears in the above numbered patent requiring correction and that the said Letters Patent should read as corrected below.

Column 2, line 36, for "all temperatures being in degrees centigrade, the" read -- and the relationship between parts by weight and --; lines 63 and 64, strike out ", melting point (M.P.) 102° to 104°"; column 9, line 50, the left-hand portion of the formula should appear as shown below instead of as in the patent:

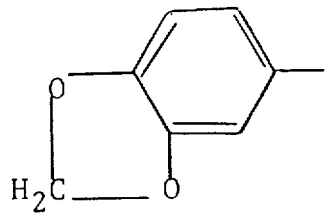

Signed and sealed this 29th day of August 1967.

(SEAL)
Attest:

ERNEST W. SWIDER            EDWARD J. BRENNER
Attesting Officer            Commissioner of Patents